(12) United States Patent
Schriener et al.

(10) Patent No.: US 7,497,278 B2
(45) Date of Patent: Mar. 3, 2009

(54) METHODS OF DEGRADING FILTER CAKES IN A SUBTERRANEAN FORMATION

(75) Inventors: Kirk Schriener, Duncan, OK (US); Trinidad Munoz, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 174 days.

(21) Appl. No.: 11/509,411

(22) Filed: Aug. 24, 2006

(65) Prior Publication Data

US 2006/0283597 A1 Dec. 21, 2006

Related U.S. Application Data

(63) Continuation-in-part of application No. 10/752,752, filed on Jan. 7, 2004, now Pat. No. 7,140,438, which is a continuation-in-part of application No. 10/641,242, filed on Aug. 14, 2003, now Pat. No. 7,080,688, and a continuation-in-part of application No. 10/650,101, filed on Aug. 26, 2003, now Pat. No. 7,276,466.

(51) Int. Cl.
*E21B 21/00* (2006.01)
*E21B 37/00* (2006.01)
*C09K 8/06* (2006.01)
*C09K 8/10* (2006.01)
*C09K 8/52* (2006.01)

(52) U.S. Cl. .................. 175/64; 166/300; 166/307; 166/312; 175/65; 175/72; 507/103; 507/136; 507/140; 507/261; 507/267

(58) Field of Classification Search ................... None
See application file for complete search history.

(56) References Cited

U.S. PATENT DOCUMENTS

| | | | |
|---|---|---|---|
| 2,238,671 A | 4/1941 | Woodhouse ................. 166/21 |
| 2,485,099 A | 10/1949 | Kharasch | |
| 2,703,316 A | 3/1955 | Palmer ...................... 260/78.3 |
| 3,015,680 A | 1/1962 | Isler et al. | |
| 3,173,484 A | 3/1965 | Huitt et al. ............... 166/280.1 |
| 3,195,635 A | 7/1965 | Fast ........................ 166/280.1 |
| 3,272,650 A | 9/1966 | MacVittie ...................... 134/7 |
| 3,302,719 A | 2/1967 | Fischer .................... 166/280.2 |
| 3,364,995 A | 1/1968 | Atkins et al. ............. 166/280.1 |
| 3,366,178 A | 1/1968 | Malone et al. ........... 166/280.1 |
| 3,455,390 A | 7/1969 | Gallus ........................ 166/295 |
| 3,658,832 A | 4/1972 | Asato et al. | |
| 3,784,585 A | 1/1974 | Schmitt et al. ............... 260/861 |
| 3,819,525 A | 6/1974 | Hattenbrun ................. 252/132 |
| 3,828,854 A | 8/1974 | Templeton et al. .......... 166/307 |
| 3,868,998 A | 3/1975 | Lybarger et al. ............ 166/278 |
| 3,912,692 A | 10/1975 | Casey et al. ................ 260/78.3 |
| 3,948,672 A | 4/1976 | Harnsberger ................. 106/90 |
| 3,955,993 A | 5/1976 | Curtice ........................ 106/90 |
| 3,960,736 A | 6/1976 | Free et al. ............... 252/8.55 R |
| 3,968,840 A | 7/1976 | Tate ........................ 166/280.1 |
| 3,998,272 A | 12/1976 | Maly .......................... 166/281 |
| 3,998,744 A | 12/1976 | Arnold et al. ............... 507/269 |
| 4,068,718 A | 1/1978 | Cooke, Jr. et al. ......... 166/280.2 |
| 4,169,798 A | 10/1979 | DeMartino ............. 252/8.55 R |
| 4,172,066 A | 10/1979 | Zweigle et al. ....... 260/29.6 TA |
| 4,261,421 A | 4/1981 | Watanabe ................... 166/281 |
| 4,387,769 A | 6/1983 | Erbstoesser et al. ......... 166/295 |
| 4,390,417 A | 6/1983 | Sweeney | |
| 4,460,052 A | 7/1984 | Gockel ......................... 175/72 |
| 4,470,915 A | 9/1984 | Conway ................. 252/8.55 R |
| 4,498,995 A | 2/1985 | Gockel .................. 252/8.5 LC |
| 4,526,695 A | 7/1985 | Erbstoesser et al. ..... 252/8.55 R |
| 4,694,905 A | 9/1987 | Armbruster ................. 166/280 |
| 4,715,967 A | 12/1987 | Bellis ....................... 252/8.551 |
| 4,716,964 A | 1/1988 | Erbstoesser et al. ......... 166/284 |
| 4,785,884 A | 11/1988 | Armbruster ................. 166/280 |
| 4,797,262 A | 1/1989 | Dewitz ....................... 422/142 |
| 4,809,783 A | 3/1989 | Hollenbeck et al. ......... 166/307 |
| 4,817,721 A | 4/1989 | Pober ......................... 166/295 |
| 4,843,118 A | 6/1989 | Lai et al. ..................... 524/555 |
| 4,848,467 A | 7/1989 | Cantu et al. ................ 166/281 |

(Continued)

FOREIGN PATENT DOCUMENTS

| | | |
|---|---|---|
| EP | 0 510 762 A2 | 10/1992 |
| EP | 0 879 935 A2 | 11/1998 |
| EP | 0 879 935 A3 | 2/1999 |
| EP | 1 413 710 A1 | 4/2004 |
| GB | 2 412 389 | 3/2004 |
| WO | WO 93/15127 A1 | 8/1993 |
| WO | WO 94/07949 A1 | 4/1994 |

(Continued)

OTHER PUBLICATIONS

U.S. Appl. No. 11/047,876, filed Jan. 31, 2005, Mang et al.
U.S. Appl. No. 11/049,600, filed Feb. 2, 2005, Mang et al.
U.S. Appl. No. 11/062,943, filed Feb. 22, 2005, Saini et al.
U.S. Appl. No. 11/062,956, filed Feb. 22, 2005, Surjaatmadja et al.
U.S. Appl. No. 11/147,093, filed Jun. 7, 2005, Todd et al.
U.S. Appl. No. 11/128,060, filed May 12, 2005, Saini.
U.S. Appl. No. 11/127,583, filed May 12, 2005, Saini.

(Continued)

*Primary Examiner*—George Suchfield
(74) *Attorney, Agent, or Firm*—Craig W. Roddy; Baker Botts, L.L.P.

(57) ABSTRACT

Many methods are presented including one that comprises: providing a well drill-in and servicing fluid comprising an aqueous fluid, a viscosifier, a fluid loss control additive, a bridging agent, and an orthoester composition; using the well drill-in and servicing fluid to drill a well bore in a subterranean formation; allowing the well drill-in and servicing fluid to establish a filter cake in at least a portion of the well bore; contacting at least a portion of the filter cake with a breaker fluid comprising an orthoester composition; and allowing at least a portion of the filter cake to degrade.

20 Claims, No Drawings

U.S. PATENT DOCUMENTS

| | | | | |
|---|---|---|---|---|
| 4,886,354 | A | 12/1989 | Welch et al. | 356/70 |
| 4,957,165 | A | 9/1990 | Cantu et al. | 166/295 |
| 4,961,466 | A | 10/1990 | Himes et al. | 166/250 |
| 4,986,353 | A | 1/1991 | Clark et al. | 166/279 |
| 4,986,354 | A | 1/1991 | Cantu et al. | 166/279 |
| 4,986,355 | A | 1/1991 | Casad et al. | 166/295 |
| 5,082,056 | A | 1/1992 | Tackett, Jr. | 166/295 |
| 5,142,023 | A | 8/1992 | Gruber et al. | 528/354 |
| 5,192,615 | A | 3/1993 | McDougall et al. | |
| 5,211,234 | A | 5/1993 | Floyd | |
| 5,216,050 | A | 6/1993 | Sinclair | 524/108 |
| 5,247,059 | A | 9/1993 | Gruber et al. | 528/354 |
| 5,249,628 | A | 10/1993 | Surjaatmadja | 166/305 |
| 5,295,542 | A | 3/1994 | Cole et al. | 166/278 |
| 5,325,923 | A | 7/1994 | Surjaatmadja et al. | 166/308 |
| 5,330,005 | A | 7/1994 | Card et al. | 166/280 |
| 5,359,026 | A | 10/1994 | Gruber | 528/354 |
| 5,360,068 | A | 11/1994 | Sprunt et al. | 166/259 |
| 5,363,916 | A | 11/1994 | Himes et al. | 166/276 |
| 5,373,901 | A | 12/1994 | Norman et al. | 166/300 |
| 5,386,874 | A | 2/1995 | Laramay et al. | 166/300 |
| 5,396,957 | A | 3/1995 | Surjaatmadja et al. | 166/308 |
| 5,402,846 | A | 4/1995 | Jennings, Jr. et al. | 166/259 |
| 5,439,055 | A | 8/1995 | Card et al. | 166/280 |
| 5,460,226 | A | 10/1995 | Lawton et al. | 166/300 |
| 5,464,060 | A | 11/1995 | Hale et al. | 166/293 |
| 5,475,080 | A | 12/1995 | Gruber et al. | 528/354 |
| 5,484,881 | A | 1/1996 | Gruber et al. | 528/354 |
| 5,497,830 | A | 3/1996 | Boles et al. | 166/300 |
| 5,499,678 | A | 3/1996 | Surjaatmadja et al. | 166/298 |
| 5,504,235 | A | 4/1996 | Hirose et al. | |
| 5,505,787 | A | 4/1996 | Yamaguchi | 134/4 |
| 5,512,071 | A | 4/1996 | Yam et al. | 51/307 |
| 5,536,807 | A | 7/1996 | Gruber et al. | 528/354 |
| 5,591,700 | A | 1/1997 | Harris et al. | 507/204 |
| 5,594,095 | A | 1/1997 | Gruber et al. | 528/354 |
| 5,604,186 | A | 2/1997 | Hunt et al. | 507/204 |
| 5,607,905 | A | 3/1997 | Dobson, Jr. et al. | 507/211 |
| 5,670,473 | A | 9/1997 | Scepanski | 510/445 |
| 5,698,322 | A | 12/1997 | Tsai et al. | 428/373 |
| 5,765,642 | A | 6/1998 | Surjaatmadja | 166/297 |
| 5,791,415 | A | 8/1998 | Nguyen et al. | 166/280 |
| 5,833,000 | A | 11/1998 | Weaver et al. | 166/276 |
| 5,849,401 | A | 12/1998 | El-Afandi et al. | 428/215 |
| 5,853,048 | A | 12/1998 | Weaver et al. | 166/279 |
| 5,893,416 | A | 4/1999 | Read | 166/304 |
| 5,908,073 | A | 6/1999 | Nguyen et al. | 166/276 |
| 5,909,774 | A | 6/1999 | Griffith et al. | |
| 5,924,488 | A | 7/1999 | Nguyen et al. | 166/280 |
| 5,964,291 | A | 10/1999 | Bourne et al. | 166/279 |
| 6,004,400 | A | 12/1999 | Bishop et al. | 134/2 |
| 6,024,170 | A | 2/2000 | McCabe et al. | 166/300 |
| 6,028,113 | A | 2/2000 | Scepanski | 514/643 |
| 6,047,772 | A | 4/2000 | Weaver et al. | 166/276 |
| 6,114,410 | A | 9/2000 | Betzold | 523/130 |
| 6,123,965 | A | 9/2000 | Jacob et al. | 424/489 |
| 6,131,661 | A | 10/2000 | Conner et al. | 166/300 |
| 6,135,987 | A | 10/2000 | Tsai et al. | 604/365 |
| 6,143,698 | A | 11/2000 | Murphey et al. | 507/145 |
| 6,162,766 | A | 12/2000 | Muir et al. | 507/267 |
| 6,169,058 | B1 | 1/2001 | Le et al. | 507/222 |
| 6,172,011 | B1 | 1/2001 | Card et al. | 507/204 |
| 6,189,615 | B1 | 2/2001 | Sydansk | 166/270 |
| 6,202,751 | B1 | 3/2001 | Chatterji et al. | 166/276 |
| 6,209,643 | B1 | 4/2001 | Nguyen et al. | 166/276 |
| 6,209,646 | B1 | 4/2001 | Reddy et al. | 166/300 |
| 6,214,773 | B1 | 4/2001 | Harris et al. | 507/271 |
| 6,242,390 | B1 | 6/2001 | Mitchell et al. | 507/211 |
| 6,260,622 | B1 | 7/2001 | Blok et al. | 166/305.1 |
| 6,291,013 | B1 | 9/2001 | Gibson et al. | 427/213.3 |
| 6,311,773 | B1 | 11/2001 | Todd et al. | 166/280 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,357,527 | B1 | 3/2002 | Norman et al. | 166/300 |
| 6,364,945 | B1 | 4/2002 | Chatterji et al. | 106/677 |
| 6,380,138 | B1 | 4/2002 | Ischy et al. | 507/204 |
| 6,387,986 | B1 | 5/2002 | Moradi-Araghi et al. | 523/211 |
| 6,390,195 | B1 | 5/2002 | Nguyen et al. | 166/276 |
| 6,394,185 | B1 | 5/2002 | Constien | 166/296 |
| 6,422,314 | B1 | 7/2002 | Todd et al. | 166/312 |
| 6,440,460 | B1 | 8/2002 | Gurny et al. | |
| 6,454,003 | B1 | 9/2002 | Chang et al. | 166/270 |
| 6,485,947 | B1 | 11/2002 | Rajgarhia et al. | 435/139 |
| 6,488,763 | B2 | 12/2002 | Brothers et al. | 106/692 |
| 6,494,263 | B2 | 12/2002 | Todd | 166/312 |
| 6,508,305 | B1 | 1/2003 | Brannon et al. | 166/293 |
| 6,509,301 | B1 | 1/2003 | Vollmer | 507/236 |
| 6,527,051 | B1 | 3/2003 | Reddy et al. | 166/300 |
| 6,554,071 | B1 | 4/2003 | Reddy et al. | 166/293 |
| 6,569,814 | B1 | 5/2003 | Brady et al. | 507/201 |
| 6,599,863 | B1 | 7/2003 | Palmer et al. | 507/219 |
| 6,667,279 | B1 | 12/2003 | Hessert et al. | 507/225 |
| 6,669,771 | B1 | 12/2003 | Tokiwa et al. | 106/162.7 |
| 6,681,856 | B1 | 1/2004 | Chatterji et al. | 166/294 |
| 6,686,328 | B1 | 2/2004 | Binder | 510/446 |
| 6,702,023 | B1 | 3/2004 | Harris et al. | 166/307 |
| 6,710,019 | B1 | 3/2004 | Sawdon et al. | 507/136 |
| 6,761,218 | B2 | 7/2004 | Nguyen et al. | 166/278 |
| 6,763,888 | B1 | 7/2004 | Harris et al. | 166/305.1 |
| 6,793,018 | B2 | 9/2004 | Dawson et al. | 166/300 |
| 6,817,414 | B2 | 11/2004 | Lee | 166/278 |
| 6,896,058 | B2 | 5/2005 | Munoz, Jr. et al. | 166/279 |
| 6,949,491 | B2 | 9/2005 | Cooke, Jr. | 507/219 |
| 6,983,801 | B2 | 1/2006 | Dawson et al. | 166/300 |
| 6,997,259 | B2 | 2/2006 | Nguyen et al. | |
| 7,021,377 | B2 | 4/2006 | Todd et al. | |
| 7,036,586 | B2 | 5/2006 | Roddy et al. | |
| 7,080,688 | B2 * | 7/2006 | Todd et al. | 166/278 |
| 7,093,664 | B2 | 8/2006 | Todd et al. | |
| 7,140,438 | B2 * | 11/2006 | Frost et al. | 166/278 |
| 7,168,489 | B2 * | 1/2007 | Frost et al. | 166/278 |
| 7,195,068 | B2 * | 3/2007 | Todd | 166/300 |
| 7,276,466 | B2 * | 10/2007 | Todd et al. | 507/260 |
| 2001/0016562 | A1 | 8/2001 | Muir et al. | 507/201 |
| 2002/0036088 | A1 | 3/2002 | Todd | 166/300 |
| 2002/0125012 | A1 | 9/2002 | Dawson et al. | 166/300 |
| 2003/0060374 | A1 | 3/2003 | Cooke, Jr. | 507/200 |
| 2003/0114314 | A1 | 6/2003 | Ballard et al. | 507/100 |
| 2003/0130133 | A1 | 7/2003 | Vollmer | 507/100 |
| 2003/0188766 | A1 | 10/2003 | Banerjee et al. | 134/7 |
| 2003/0234103 | A1 | 12/2003 | Lee et al. | 166/293 |
| 2003/0236171 | A1 | 12/2003 | Nguyen et al. | |
| 2004/0014607 | A1 | 1/2004 | Sinclair et al. | 507/200 |
| 2004/0040706 | A1 | 3/2004 | Hossaini et al. | 166/278 |
| 2004/0055747 | A1 | 3/2004 | Lee | 166/278 |
| 2004/0070093 | A1 | 4/2004 | Mathiowitz et al. | 264/4 |
| 2004/0094300 | A1 | 5/2004 | Sullivan et al. | 166/308.1 |
| 2004/0106525 | A1 | 6/2004 | Willbert et al. | 507/200 |
| 2004/0138068 | A1 | 7/2004 | Rimmer et al. | 507/100 |
| 2004/0152601 | A1 | 8/2004 | Still et al. | 507/100 |
| 2004/0152602 | A1 | 8/2004 | Boles | 507/100 |
| 2004/0162386 | A1 | 8/2004 | Altes et al. | 524/806 |
| 2004/0214724 | A1 | 10/2004 | Todd et al. | 507/203 |
| 2004/0216876 | A1 | 11/2004 | Lee | 166/280.1 |
| 2004/0221989 | A1 | 11/2004 | Zhou et al. | |
| 2004/0231845 | A1 | 11/2004 | Cooke, Jr. | 166/279 |
| 2004/0261993 | A1 | 12/2004 | Nguyen | 166/276 |
| 2004/0261995 | A1 | 12/2004 | Nguyen et al. | 166/279 |
| 2004/0261996 | A1 | 12/2004 | Munoz, Jr. et al. | 166/279 |
| 2004/0261999 | A1 | 12/2004 | Nguyen | 166/292 |
| 2005/0006095 | A1 | 1/2005 | Justus et al. | 166/295 |
| 2005/0028976 | A1 | 2/2005 | Nguyen | 166/276 |
| 2005/0034861 | A1 | 2/2005 | Saini et al. | 166/278 |

| | | | |
|---|---|---|---|
| 2005/0034865 A1 | 2/2005 | Todd et al. | 166/304 |
| 2005/0034868 A1 | 2/2005 | Frost et al. | 166/307 |
| 2005/0045328 A1 | 3/2005 | Frost et al. | 166/278 |
| 2005/0051330 A1 | 3/2005 | Nguyen | |
| 2005/0056423 A1 | 3/2005 | Todd et al. | |
| 2005/0059556 A1 | 3/2005 | Munoz, Jr. et al. | 507/103 |
| 2005/0059557 A1 | 3/2005 | Todd et al. | 507/110 |
| 2005/0059558 A1 | 3/2005 | Blauch et al. | 507/203 |
| 2005/0103496 A1 | 5/2005 | Todd et al. | 166/278 |
| 2005/0126780 A1 | 6/2005 | Todd et al. | 166/280 |
| 2005/0126785 A1 | 6/2005 | Todd | 166/307 |
| 2005/0130848 A1 | 6/2005 | Todd et al. | 166/276 |
| 2005/0161220 A1 | 7/2005 | Todd et al. | 166/283 |
| 2005/0167104 A1 | 8/2005 | Roddy et al. | 166/279 |
| 2005/0167105 A1 | 8/2005 | Roddy et al. | 166/293 |
| 2005/0167107 A1 | 8/2005 | Roddy et al. | |
| 2005/0183741 A1 | 8/2005 | Surjaatmadja et al. | 134/6 |
| 2005/0205258 A1 | 9/2005 | Reddy et al. | 166/292 |
| 2005/0205266 A1 | 9/2005 | Todd et al. | 166/376 |
| 2005/0252659 A1 | 11/2005 | Sullivan et al. | 166/280.1 |
| 2005/0272613 A1 | 12/2005 | Cooke, Jr. | 507/219 |
| 2005/0274517 A1 | 12/2005 | Blauch et al. | 166/280 |
| 2005/0277554 A1 | 12/2005 | Blauch et al. | 507/203 |
| 2006/0016596 A1 | 1/2006 | Pauls et al. | 166/276 |
| 2006/0032633 A1 | 2/2006 | Nguyen | 166/280 |
| 2006/0046938 A1 | 3/2006 | Harris et al. | 507/219 |
| 2006/0048938 A1 | 3/2006 | Kalman | 166/278 |
| 2006/0065397 A1 | 3/2006 | Nguyen et al. | 166/280.1 |
| 2006/0105917 A1 | 5/2006 | Munoz, Jr. et al. | 507/103 |
| 2006/0105918 A1 | 5/2006 | Munoz, Jr. et al. | 507/203 |
| 2006/0169182 A1 | 8/2006 | Todd et al. | 106/802 |
| 2006/0169449 A1 | 8/2006 | Mang et al. | 166/278 |
| 2006/0169450 A1 | 8/2006 | Mang et al. | 166/278 |
| 2006/0172891 A1 | 8/2006 | Todd et al. | 504/289 |
| 2006/0172894 A1 | 8/2006 | Mang et al. | 507/219 |
| 2006/0172895 A1 | 8/2006 | Mang et al. | 507/219 |

FOREIGN PATENT DOCUMENTS

| | | |
|---|---|---|
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

Vichaibun, et al, *A New Assay for the Enzymatic Degradation of Polylactic Acid, Short Report*, ScienceAsia, vol. 29, 2003 (pp. 297-300).

Halliburton, *Cobra Frac$^{SM}$ Service, Coiled Tubing Fracturing—Cost-Effective Method for Stimulating Untapped Reserves*, HO2319R, Halliburton Engergy Services, 2000.

Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.

M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.

Skrabal et al, *The Hydrolysis Rate Of Orthoformic Acid Ethyl Ether*, Chemical Institute of the University of Graz, Jan. 13, 1921, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalzyed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "Trigger" Useful for Oilfield Applications*, Society of Petroleum Engineers, Inc., SPE 92709, Feb. 4, 2005.

Office action dated Jul. 27, 2005 from U.S. Appl. No. 10/752,752.
Office action dated Oct. 19, 2005 from U.S. Appl. No. 10/752,752.
Office action dated Mar. 3, 2006 from U.S Appl. No. 10/752,752.
Office action dated Mar. 2, 2006 from U.S. Appl. No. 10/785,300.

Morrison, Robert et al., Organic Chemistry, Sixth Edition, 1992, pp. 242-243.

Heller, et al. Poly(ortho esters) For The Pulsed And Continuous Delivery of Peptides and Proteins, Controlled Release and Biomedical Polymers Department, SRI International, (pp. 39-46), 1995.

Halliburton, CobraJet FracSM Service, Cost-effective Technology That Can Help Reduce Cost Per BOA Produced, Shorten Cycle Time and Reduce Capex, Halliburton Communications, 2000.

Halliburton, SurgiFracSM Service, A Quick and Cost-Effective method to Help Boost Production From Openhole Horizontal Completions, Halliburton Communications, HO3297, 2002.

Chelating Agents, Encyclopedia of Chemical Technology, vol. 5 (764-795), 2003.

Frost, et al. Orthoester Compositions and Methods of Use in Subterranean Applications, U.S. Appl. No. 10/752,752, filed Jan. 6, 2004.

Blauch, et al., Aqueous Tackifier and Methods of Controlling Particulates, U.S. Appl. No. 10/864,061, filed Jun. 9, 2004.

Foreign Search Report and Written Opinion (PCT/GB2005/0000397) dated Jul. 5, 2005.

Notice of Allowance dated Jul. 20, 2008 from U.S. Appl. No. 10/752,752.

Notice of Allowance dated Aug. 23, 2006 from U.S. Appl. No. 10/785,300.

Supplemental Notice of Allowability dated Oct. 2, 2006 from U.S. Appl. No. 10/785,300.

Office Action for U.S. Appl. No. 10/736,339 dated Nov. 14, 2008.

* cited by examiner

METHODS OF DEGRADING FILTER CAKES IN A SUBTERRANEAN FORMATION

CROSS-REFERENCE TO RELATED APPLICATIONS

This application is a continuation-in-part of U.S. application Ser. No. 10/752,752 entitled Orthoester Compositions and Methods of Use in Subterranean Applications, filed on Jan. 7, 2004 now U.S. Pat. No. 7,140,438, which is a continuation in part of U.S. application Ser. No. 10/641,242 entitled Compositions and Methods for Degrading Filter Cake, filed on Aug. 14, 2003 now U.S. Pat. No. 7,080,688 and U.S. application Ser. No. 10/650,101 entitled Compositions and Methods for Reducing the Viscosity of a Fluid, filed on Aug. 26, 2003 now U.S. Pat. No. 7,276,466, the entire disclosures of which are incorporated by reference.

BACKGROUND

The present invention relates to subterranean treatment operations, and more particularly, to methods of degrading filter cakes in subterranean formations.

Often, once drilling of a well bore in a subterranean formation has been initiated, a fluid referred to as a "well drill-in and servicing fluid" may be employed. As referred to herein, the term "well drill-in and servicing fluid" will be understood to mean a fluid placed in a subterranean formation, such as those from which production has been, is being, or may be cultivated. For example, an operator may begin drilling a subterranean borehole using a drilling fluid, cease drilling at a depth just above that of a productive formation, circulate a sufficient quantity of a well drill-in and servicing fluid through the bore hole to completely flush out the drilling fluid, then proceed to drill into the desired formation using the well drill-in and servicing fluid. Well drill-in and servicing fluids often may be utilized, inter alia, to minimize damage to the permeability of such formations.

In some embodiments, well drill-in and servicing fluids may include "fluid-loss-control fluids." As referred to herein, the term "fluid-loss-control fluid" will be understood to mean a fluid designed to form a filter cake onto a screen or gravel pack, or in some cases, directly onto the formation. For example, a fluid-loss-control fluid may comprise a comparatively small volume of fluid designed to form a filter cake so as to plug off a "thief zone" (e.g., a formation, most commonly encountered during drilling operations, into which the drilling fluid may be lost). Generally, well drill-in and servicing fluids are designed to form a fast and efficient filter cake on the walls of a well bore within a producing formation to minimize leak-off and damage. The filter cake often comprises an inorganic portion (e.g., calcium carbonate), and an organic portion (e.g., starch and xanthan). The filter cake generally is removed before hydrocarbons from the formation are produced. Conventional methods of removal have involved contacting the filter cake with one or more subsequent fluids.

Other conventional methods of removing the filter cake include formulating the well drill-in and servicing fluid so as to include an acid-soluble particulate solid bridging agent. The resultant filter cake formed by such well drill-in and servicing fluid then is contacted with a strong acid to ultimately dissolve the bridging agent. This method is problematic, however, because the strong acid often corrodes metallic surfaces of completion equipment (e.g., sand control screens), thereby causing such equipment to prematurely fail. Further, the strong acid may damage the producing formation. Additionally, the strong acid may cause the bridging agent to dissolve prematurely, resulting in the loss of the strong acid into the formation, before it can completely cover the filter cake.

Another method of filter cake removal has involved the use of a water-soluble particulate solid bridging agent in the well drill-in and servicing fluid, which bridging agent subsequently is contacted with an aqueous salt solution that is undersaturated with respect to such bridging agent. This method is problematic, however, because such bridging agents may require a relatively long period of time to dissolve in the aqueous salt solution, due to, inter alia, the presence of various polymeric material in the well drill-in and servicing fluids. Such polymeric material may prevent the aqueous salt solution from contacting the water-soluble bridging agents.

Operators also have attempted to remove the filter cake by contacting it with a combination of an acid and an oxidizer. The acid may be used to degrade the inorganic portion of the filter cake, while the oxidizer may be employed to degrade the organic portion. However, this may be unnecessarily expensive, as it involves placement of additional components into the formation, at additional cost. For example, operators have attempted to remove the filter cake by flowing a solution comprising hydrogen peroxide into the well bore and permitting it to contact the filter cake. This may be problematic, however, as the transportation, storage, and handling of hydrogen peroxide may present safety concerns.

Another method involves formulating a drill-in fluid to include an acid-soluble particulate solid bridging agent and then contacting the resultant filter cake formed by such drill-in fluid with a delayed-release acid system to ultimately dissolve the bridging agent. A common type of delayed-release acid system may comprise esters that slowly hydrolyze to form acids that may ultimately degrade the acid-soluble portion of the filter cake. This method of removing the filter cake may be problematic, however, because the acid may be prevented from dissolving at least a portion of the acid-soluble bridging agents, due to, inter alia, the presence of polymeric material in the well drill-in and servicing fluids. It is believed that this polymeric material may prevent the acid from contacting the bridging agent by acting as a protective type of coating on the bridging agents.

SUMMARY

The present invention relates to subterranean treatment operations, and more specifically, to methods for degrading filter cakes in subterranean formations.

In one embodiment, the present invention provides methods comprising: providing a well drill-in and servicing fluid comprising an aqueous fluid, a viscosifier, a fluid loss control additive, a bridging agent, and an orthoester composition; using the well drill-in and servicing fluid to drill a well bore in a subterranean formation; allowing the well drill-in and servicing fluid to establish a filter cake in at least a portion of the well bore; contacting at least a portion of the filter cake with a breaker fluid comprising an orthoester composition; and allowing at least a portion of the filter cake to degrade.

In another embodiment, the present invention provides methods comprising: providing a well drill-in and servicing fluid comprising an aqueous fluid, a viscosifier, a fluid loss control additive, a bridging agent, and an orthoester composition; allowing the well drill-in and servicing fluid to establish a filter cake in at least a portion of a well bore; contacting at least a portion of the filter cake with a breaker fluid comprising an orthoester composition; allowing the orthoester composition to generate an acid; and allowing at least a portion of the filter cake to degrade.

In yet another embodiment, the present invention provides methods comprising: providing a well drill-in and servicing fluid comprising an aqueous fluid, a viscosifier, a fluid loss control additive, a bridging agent, and an orthoester composition; allowing the well drill-in and servicing fluid to establish at least a portion of a filter cake in at least a portion of a well bore; contacting at least a portion of the filter cake with a breaker fluid comprising an orthoester composition; allowing the orthoester composition to generate an acid; and allowing the acid to degrade at least a portion of the filter cake.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean treatment operations, and more specifically, to methods for degrading filter cakes in subterranean formations.

In one embodiment, the present invention provides methods of drilling a well bore comprising the following steps: providing a well drill-in and servicing fluid comprising an aqueous fluid, a viscosifier, a fluid loss control additive, a bridging agent, and an orthoester composition; using the drill-in fluid to drill at least a portion of a well bore in a subterranean formation; allowing the drill-in fluid to establish a filter cake in at least a portion of the well bore; contacting the filter cake with a breaker fluid comprising an orthoester composition; and allowing the filter cake to degrade.

One of the many advantages of the present invention is that the methods presented herein may allow for the efficient removal of a filter cake from a well bore by providing an orthoester composition in both a well drill-in and servicing fluid and in a breaker fluid. By incorporating an orthoester composition into both fluids, among other possible benefits, the problems associated with polymeric material acting as a protective coating for bridging agents may be reduced and/or eliminated. Other benefits, objects, and advantages will be apparent to one of ordinary skill in the art with the benefit of this disclosure.

I. Suitable Well Drill-in and Servicing Fluids

The aqueous fluid utilized in the well drill-in and servicing fluids of the present invention may be any aqueous-based fluid, from any source, provided that it does not contain an excess of compounds that may adversely react with the other components used in accordance with this invention or with the subterranean formation. Such aqueous-based fluids may comprise fresh water, salt water (e.g., water containing one or more salts dissolved therein), brine (e.g., saturated salt water), or seawater. Generally, the aqueous fluid may be present in an amount sufficient to form a pumpable well drill-in and servicing fluid. In some embodiments, the aqueous fluid may be present in an amount in the range of from about 20% to about 99.99% by volume of the well drill-in and servicing fluid.

The well drill-in and servicing fluids of the present invention may further comprise a viscosifier. Examples of suitable viscosifiers include, inter alia, any viscosifier suitable for use in subterranean applications, including, but not limited to, biopolymers (e.g., xanthan and succinoglycan), cellulose, cellulose derivatives (e.g., hydroxyethylcellulose), guar, and guar derivatives (e.g., hydroxypropyl guar). In certain embodiments of the present invention, the viscosifier may be guar. Commercially available examples of suitable viscosifiers include, but are not limited to, those that are available from Halliburton Energy Services, Inc., of Duncan, Okla., under the trade name "N-VIS." In some embodiments, the viscosifier may be present in the drill-in fluids of the present invention in an amount sufficient to provide a desired degree of solids suspension or viscosity. In some embodiments, the viscosifier may be present in the well drill-in and servicing fluids of the present invention in an amount in the range of from about 0.01% to about 1.0% by weight. In other embodiments, the viscosifier may be present in the well drill-in and servicing fluids of the present invention in an amount in the range of from about 0.2% to about 0.6% by weight.

The well drill-in and servicing fluids of the present invention may further comprise a fluid loss control additive. A variety of fluid loss control additives can be included in the drill-in fluids of the present invention, including, but not limited to, any fluid loss control additives that are suitable for use in subterranean applications and that are compatible with other components in the fluids. Specific examples may include polysaccharides and derivatives thereof. Other examples of suitable fluid loss control additives include, inter alia, starch, starch ether derivatives, hydroxyethylcellulose, cross-linked hydroxyethylcellulose, and combinations thereof. In certain embodiments, the fluid loss control additive is starch. Commercially available examples of suitable fluid loss control additives include, but are not limited to, those that are available from Halliburton Energy Services, Inc., of Duncan, Okla., under the trade name "N-Dril HT PLUS." The fluid loss control additive generally is present in the drill-in fluids of the present invention in an amount sufficient to provide a desired degree of fluid loss control. In some embodiments, the fluid loss control additive may be present in the drill-in fluids of the present invention in an amount in the range of from about 0.01% to about 3% by weight. In other embodiments, the fluid loss control additive may be present in the drill-in fluids of the present invention in an amount in the range of from about 1% to about 2% by weight.

The well drill-in and servicing fluids of the present invention may further comprise a bridging agent. The well drill-in and servicing fluids of the present invention suspend the bridging agent and, as the well drill-in and servicing fluids begin to form a filter cake within the subterranean formation, the bridging agent becomes distributed throughout the resulting filter cake, most preferably uniformly. In certain embodiments of the present invention, the filter cake may form upon the face of the formation itself, upon a sand screen, or upon a gravel pack or any other surface within the well bore. In certain embodiments of the present invention, the bridging agent comprises, inter alia, calcium carbonate, a magnesium compound (e.g., magnesium oxide), or a chemically bonded ceramic bridging agent, or derivatives thereof. Other bridging agents that may be used in subterranean formations also may be suitable. Generally, the bridging agent is present in the well drill-in and servicing fluids of the present invention in an amount sufficient to create an efficient filter cake. As referred to herein, the term "efficient filter cake" will be understood to mean a filter cake comprising an amount of material required to provide a desired level of fluid loss control. In certain embodiments of the present invention, the bridging agent may be present in the well drill-in and servicing fluids of the present invention in an amount ranging from about 0.1% to about 32% by weight. In certain embodiments of the present invention, the bridging agent may be present in the well drill-in and servicing fluids of the present invention in an amount in the range of from about 3% and about 10% by weight. In certain embodiments of the present invention, the bridging agent may be present in the well drill-in and servicing fluids of the present invention in an amount sufficient to provide a fluid loss of less than about 15 mL in tests conducted according to the procedures set forth by API Recommended Practice (RP) 13.

The well drill-in and servicing fluids of the present invention further comprise an orthoester composition. These orthoester compositions are believed to generate acids that are capable of degrading the acid-soluble portion of a filter cake. Examples of orthoesters suitable to include in the orthoester compositions of the present invention have a structure defined by the formula: RC(OR')(OR")(OR'''), wherein R', R", and R''' are not hydrogen, and R', R", and R''' may or may not be the same group. R', R", or R''' may comprise a heteroatom that may affect the solubility of the chosen orthoester in a given application. Suitable heteroatoms could include nitrogen or oxygen. Examples of suitable orthoesters and poly(orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates). Suitable orthoesters also may be orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors.

To allow the orthoester to hydrolyze to produce an acid, a source of water is needed. The water may be present in an amount sufficient to provide the desired degree of hydrolysis of the orthoester. In some embodiments, the water may present in amount of from about 2 moles of water for about every 1 mole of orthoester to an excess of water, which may help ensure the solubility of the reaction product of the reaction between the generated acid and the acid-soluble component, e.g., solubility with the acid-soluble portion of a filter cake. One of ordinary skill in the art with the benefit of this disclosure will recognize whether a suitable amount of water is present in either the orthoester composition or in the well bore for a desired application.

The orthoester compositions of the present invention also may comprise an inhibitor, which may delay the generation of the acid from the orthoester of the orthoester composition and also may neutralize the generated acid during the delay period. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred to achieve the delayed generation of the acid and the neutralization of the generated acid for a desired delay period.

The orthoester compositions of the present invention can have any suitable form. For instance, these compositions can be used in a solution form, a gel form, or an emulsion form. In certain applications, a solution form may be useful, e.g., when a faster break of a treatment fluid or a faster degradation of a filter cake, is desired; in other applications, e.g., when a slower break or degradation is desirable, a gel or emulsion form may be used. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla.

In some embodiments, the orthoester composition should be included in the well drill-in and servicing fluid in an amount in the range of from about 0.01% to about 99.99% by weight. In other embodiments, the orthoester composition should be included in the well drill-in and servicing fluid in an amount in the range of from about 1% to about 15% by weight.

II. Suitable Breaker Fluids

The base fluid utilized in the breaker fluids of the present invention may be aqueous-based, non-aqueous-based, or mixtures thereof. Where the base fluid is aqueous-based, the base fluid may comprise fresh water, salt water (e.g., water containing one or more salts dissolved therein), brine (e.g., saturated salt water), or seawater. Generally, the water can be from any source provided that it does not contain an excess of compounds that may adversely affect other components in the breaker fluid. Where the base fluid is non-aqueous-based, the base fluid may comprise any number of organic fluids that are suitable for use in subterranean formations. Examples of suitable organic fluids include, but are not limited to, mineral oils, synthetic oils, esters, and the like, and derivatives thereof. Generally, these organic fluids may be referred to generically as "oils." This term does not imply any particular composition. Generally, any oil in which a water solution of salts can be emulsified may be suitable for use as a non-aqueous-based base fluid in the breaker fluids of the present invention. Generally, the base fluid may be present in an amount sufficient to form a pumpable breaker fluid. More particularly, the base fluid typically is present in the breaker fluids of the present invention in an amount in the range of from about 20% to about 99.99% by volume of the breaker fluid.

The breaker fluids of the present invention further comprise an orthoester composition. These orthoester compositions generate acids that are capable of degrading the acid-soluble portion of a filter cake. Examples of orthoesters suitable to include in the orthoester compositions of the present invention have a structure defined by the formula: RC(OR')(OR")(OR'''), wherein R', R", and R''' are not hydrogen, and R', R", and R''' may or may not be the same group. R', R", or R''' may comprise a heteroatom that may affect the solubility of the chosen orthoester in a given application. Suitable heteroatoms could include nitrogen or oxygen. Examples of suitable orthoesters and poly(orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates). Suitable orthoesters also may be orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors.

To allow the orthoester to hydrolyze to produce an acid, a source of water is needed. The water may be present in an amount sufficient to provide the desired degree of hydrolysis of the orthoester. In some embodiments, the water may be present in an amount from about 2 moles of water for about every 1 mole of orthoester to an excess of water, which may help ensure the solubility of the reaction product of the reaction between the generated acid and the acid-soluble component, e.g., solubility with the acid-soluble portion of a filter cake. One of ordinary skill in the art with the benefit of this disclosure will recognize whether a suitable amount of water is present in either the orthoester composition or in the well bore for a desired application.

The orthoester compositions also may comprise an inhibitor, which may delay the generation of the acid from the orthoester of the orthoester composition and also may neutralize the generated acid during the delay period. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred to achieve the delayed generation of the acid and the neutralization of the generated acid for a desired delay period.

The orthoester compositions can have any suitable form. For instance, these compositions can be used in a solution form, a gel form, or an emulsion form. In certain applications, a solution form may be useful, e.g., when a faster break of a treatment fluid or a faster degradation of a filter cake, is desired; in other applications, e.g., when a slower break or degradation is desirable, a gel or emulsion form may be used. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla.

In some embodiments, the orthoester composition should be included in the breaker fluid in an amount in the range of from about 0.01% to about 99.9% by weight. In other embodiments, the orthoester composition should be included in the breaker fluid in an amount in the range of from about 1% to about 15% by weight.

In some embodiments, chemical components that can degrade a polymeric portion of a filter cake may optionally also be used. Suitable examples include compatible oxidizers and/or enzymes that are capable of degrading the polymeric components of the filter cake. These oxidizers or enzymes may be in any suitable form, for example, encapsulated or otherwise contained to create a beneficial release of the oxidizer or enzyme.

Other additives may be appropriate for use in the breaker fluids of the present invention as may be recognized by one skilled in the art with the benefit of this disclosure.

To facilitate a better understanding of the present invention, the following examples of certain aspects of some embodiments are given. In no way should the following examples be read to limit, or define, the scope of the invention.

EXAMPLE 1

A filtration test was conducted in which a filter cake of the present invention was constructed. The sample composition was formulated comprising 336 mL of a 10% aqueous solution of sodium chloride by weight, to which 0.85 grams of clarified liquid xanthan biopolymer, 7.4 grams of a non-ionic starch derivative, 0.1 grams of sodium hydroxide, and 35 grams of calcium carbonate were added. Of the 35 grams of calcium carbonate, 10 grams had a size of approximately 5 microns and 25 grams had a size of approximately 25 microns. This sample composition was then hot rolled for 16 hours at 150° F. Next, 315 milliliters ("mL") of the sample composition was added to 35 mL of tripropyl orthoformate and then the composition was placed in a high pressure, high temperature cell.

The filtration test comprised constructing filter cakes in a high pressure, high temperature cell on a flat "ALOXITE™" disk having a 5 micron pore throat size. The filter cakes were constructed on the face of the disk for an hour at 190° F. while applying a differential pressure of 300 psi, during which time the filter cake formed on the flat disk. The porous nature of the disk provides the potential for fluid to leak off, with the filtrate rate and volume being dependent on the integrity of the filter cake deposited on the disk. The total volume of filtrate lost for the sample composition was 8.25 mL.

The above example demonstrates, inter alia, that the well drill-in and servicing fluids of the present invention may be used to provide filter cakes having acceptable filtration leak off.

EXAMPLE 2

The sample filter cake prepared in Example 1 was then subjected to a break test, in which a sample breaker fluid of the present invention was placed into contact with the filter cake at 190° F. while applying a differential pressure of 300 psi. The sample breaker fluid was prepared by first preparing a 10.2 ppg brine stock solution. The brine stock solution comprised 872 mL of tap water, 331.0 g sodium chloride, and 25 g sodium bromide. To formulate the sample breaker fluid, 45 mL of the brine stock solution was added to 2.4 mL of an emulsifier, "WS-44," which is commercially available from Halliburton Energy Services, Duncan, Okla., and 12 mL tripropyl orthoformate.

As the breaker fluid began to break down the filter cake, the amount of filtrate (e.g., the amount of broken filter cake) was collected and measured. The results are illustrated in Table 1 below.

TABLE 1

| Time (hrs.) | Total Filtrate Loss (mL) |
| --- | --- |
| 1 | 2 |
| 2 | 3 |
| 3 | 4 |
| 4 | 5 |
| 5 | 6 |
| 12 | 18 |
| 13 | 19 |
| 14 | 20 |
| 16 | 21 |
| 17 | 23 |
| 19 | 24 |
| 20 | 24.5 |
| 21 | 26.25 |
| 22 | 27.7 |
| 36 | 51 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a well drill-in and servicing fluid comprising an aqueous fluid, a viscosifier, a fluid loss control additive, a bridging agent, and an orthoester composition;
using the well drill-in and servicing fluid to drill a well bore in a subterranean formation;
allowing the well drill-in and servicing fluid to establish a filter cake in at least a portion of the well bore;
contacting at least a portion of the filter cake with a breaker fluid comprising an orthoester composition; and
allowing at least a portion of the filter cake to degrade.

2. The method of claim 1 wherein the viscosifier is selected from the group consisting of a biopolymer, cellulose, a cellulose derivative, guar, a guar derivative, and a combination thereof.

3. The method of claim 1 wherein the viscosifier is present in the well drill-in and servicing fluid in an amount in the range of from about 0.2% to about 0.6% by weight.

4. The method of claim 1 wherein the fluid loss control additive is selected from the group consisting of starch, a starch ether derivative, hydroxyethylcellulose, cross-linked hydroxyethylcellulose, and a combination thereof.

5. The method of claim 1 wherein the fluid loss control additive is present in the well drill-in and servicing fluid in an amount sufficient to provide a desired degree of fluid loss control.

6. The method of claim 1 wherein the fluid loss control additive is present in the well drill-in and servicing fluid in an amount in the range of from about 0.01% to about 3% by weight.

7. The method of claim 1 wherein the bridging agent is selected from the group consisting of calcium carbonate, a magnesium compound, a chemically bonded ceramic bridging agent, and a derivative thereof.

8. The method of claim 1 wherein the bridging agent is present in the well drill-in and servicing fluid in an amount in the range of from about 0.1% to about 32% by weight.

9. The method of claim 1 wherein the orthoester composition comprises an orthoester having a structure defined by the formula: RC(OR')(OR")(OR'"), wherein R', R", and R'" are not hydrogen.

10. The method of claim 1 wherein the orthoester composition comprises an orthoester selected from the group consisting of trimethyl orthoacetate, triethyl orthoacetate, tripropyl orthoacetate, triisopropyl orthoacetate, poly(orthoacetates), trimethyl orthoformate, triethyl orthofonnate, tripropyl orthoformate, triisopropyl orthoformate, poly(orthoformates), trimethyl orthopropionate, triethyl orthopropionate, tripropyl orthopropionate, triisopropyl orthopropionate, poly(orthopropionates), an orthoester of glycerin, an orthoester of ethylene glycol, and any combination thereof.

11. A method comprising:
providing a well drill-in and servicing fluid comprising an aqueous fluid, a viscosifier, a fluid loss control additive, a bridging agent, and an orthoester composition;
allowing the well drill-in and servicing fluid to establish a filter cake in at least a portion of a well bore;
contacting at least a portion of the filter cake with a breaker fluid comprising an orthoester composition;
allowing the orthoester composition to generate an acid; and
allowing at least a portion of the filter cake to degrade.

12. The method of claim 11 wherein the viscosifier is selected from the group consisting of a biopolymer, cellulose, a cellulose derivative, guar, a guar derivative, and a combination thereof.

13. The method of claim 11 wherein the fluid loss control additive is selected from the group consisting of starch, a starch ether derivative, hydroxyethylcellulose, cross-linked hydroxyethylcellulose, and a combination thereof.

14. The method of claim 1 wherein the fluid loss control additive is present in the well drill-in and servicing fluid in an amount sufficient to provide a desired degree of fluid loss control.

15. The method of claim 11 wherein the bridging agent is selected from the group consisting of calcium carbonate, a magnesium compound, a chemically bonded ceramic bridging agent, and a derivative thereof.

16. The method of claim 11 wherein the orthoester composition comprises an orthoester having a structure defined by the formula: RC(OR')(OR")(OR'"), wherein R', R", and R'" are not hydrogen.

17. The method of claim 11 wherein the orthoester composition comprises an orthoester selected from the group consisting of trimethyl orthoacetate, triethyl orthoacetate, tripropyl orthoacetate, triisopropyl orthoacetate, poly(orthoacetates), trimethyl orthoformate, triethyl orthoformate, tripropyl orthoformate, triisopropyl orthoformate, poly(orthoformates), trimethyl orthopropionate, triethyl orthopropionate, tripropyl orthopropionate, triisopropyl orthopropionate, poly(orthopropionates), an orthoester of glycerin, an orthoester of ethylene glycol, and any combination thereof.

18. A method comprising:
providing a well drill-in and servicing fluid comprising an aqueous fluid, a viscosifier, a fluid loss control additive, a bridging agent, and an orthoester composition;
allowing the well drill-in and servicing fluid to establish at least a portion of a filter cake in at least a portion of a well bore;
contacting at least a portion of the filter cake with a breaker fluid comprising an orthoester composition;
allowing the orthoester composition to generate an acid; and
allowing the acid to degrade at least a portion of the filter cake.

19. The method of claim 18 wherein the orthoester composition comprises an orthoester having a structure defined by the formula: RC(OR')(OR")(OR'"), wherein R', R", and R'" are not hydrogen.

20. The method of claim 18 wherein the orthoester composition comprises an orthoester selected from the group consisting of trimethyl orthoacetate, triethyl orthoacetate, tripropyl orthoacetate, triisopropyl orthoacetate, poly(orthoacetates), trimethyl orthoformate, triethyl orthoformate, tripropyl orthoformate, triisopropyl orthoformate, poly(orthoformates), trimethyl orthopropionate, triethyl orthopropionate, tripropyl orthopropionate, triisopropyl orthopropionate, poly(orthopropionates), an orthoester of glycerin, an orthoester of ethylene glycol, and any combination thereof.

UNITED STATES PATENT AND TRADEMARK OFFICE
CERTIFICATE OF CORRECTION

PATENT NO. : 7,497,278 B2
APPLICATION NO. : 11/509411
DATED : March 3, 2009
INVENTOR(S) : Kirk Schriener and Trinidad Munoz, Jr.

It is certified that error appears in the above-identified patent and that said Letters Patent is hereby corrected as shown below:

Title Page, Item (75)
After "Trinidad Munoz, Jr., Duncan, OK (US)" insert --; Brad L. Todd, Duncan, OK (US)--.

Signed and Sealed this

Seventeenth Day of November, 2009

David J. Kappos
*Director of the United States Patent and Trademark Office*